US011895955B2

(12) United States Patent
Chen et al.

(10) Patent No.: US 11,895,955 B2
(45) Date of Patent: Feb. 13, 2024

(54) COMBINED LED LIGHTING SYSTEM FOR PLANT GROWTH

(71) Applicant: SHENZHEN NUMBER ENERGY SAVING CORPORATION, Guangdong (CN)

(72) Inventors: Hongchuan Chen, Shenzhen (CN); Yuan Yang, Shenzhen (CN); Jiaqin Li, Shenzhen (CN); Bing Ma, Shenzhen (CN)

(73) Assignee: SHENZHEN NUMBER ENERGY SAVING CORPORATION, Guangdong (CN)

( * ) Notice: Subject to any disclaimer, the term of this patent is extended or adjusted under 35 U.S.C. 154(b) by 532 days.

(21) Appl. No.: 17/152,018

(22) Filed: Jan. 19, 2021

(65) Prior Publication Data

US 2021/0212268 A1   Jul. 15, 2021

Related U.S. Application Data

(63) Continuation of application No. PCT/CN2020/072483, filed on Jan. 16, 2020.

(30) Foreign Application Priority Data

Jan. 15, 2020   (CN) .......................... 202010042127.5

(51) Int. Cl.
*A01G 7/04* (2006.01)
*H05B 45/325* (2020.01)
(Continued)

(52) U.S. Cl.
CPC ............. *A01G 7/045* (2013.01); *A01G 9/249* (2019.05); *H05B 45/325* (2020.01); *H05B 47/19* (2020.01)

(58) Field of Classification Search
CPC ...... A01G 7/045; A01G 9/249; H05B 45/325; H05B 47/19; H05B 45/30; H05B 45/345; Y02P 60/14
See application file for complete search history.

(56) References Cited

U.S. PATENT DOCUMENTS

2017/0359069 A1* 12/2017 Feldtkeller ........... H03K 3/2885
2019/0223386 A1*  7/2019 Limpert .............. F21V 33/0056

FOREIGN PATENT DOCUMENTS

CN         202721858        2/2013
CN         202721858 U *    2/2013
(Continued)

OTHER PUBLICATIONS

International Search Report issued in International Bureau of WIPO Patent Application No. PCT/CN2020/072483, dated Oct. 12, 2020 along with an English translation.

*Primary Examiner* — Abdullah A Riyami
*Assistant Examiner* — Syed M Kaiser
(74) *Attorney, Agent, or Firm* — GREENBLUM & BERNSTEIN, P.L.C.

(57) ABSTRACT

Disclosed is a combined LED grow lighting system, comprising an LED light track and at least one LED light strip which slidably connects with and longitudinally slides along the LED light track; wherein a remote control signal receiver to receive a remote control signal is configured within the LED light track, a processing device for processing the remote control signal received by the remote control signal receiver to generate a control signal for controlling a power of LED in each LED light strip is connected with each LED light strip, respectively; an LED constant current power supply and a constant current control circuit are configured within the LED light strip, and the constant current control circuit is connected with the processing device and receives
(Continued)

the control signal regarding the power of the LED light strip sent from the processing device to control the LED constant current power supply.

10 Claims, 3 Drawing Sheets

(51) Int. Cl.
    *H05B 47/19*     (2020.01)
    *A01G 9/24*     (2006.01)

(56) References Cited

FOREIGN PATENT DOCUMENTS

| | | | |
|---|---|---|---|
| CN | 103759150 | | 4/2014 |
| CN | 103759150 A | * | 4/2014 |
| CN | 203979981 | | 12/2014 |
| CN | 104486863 | | 4/2015 |
| CN | 105180018 | | 12/2015 |
| CN | 206055532 | | 3/2017 |
| CN | 208370411 | | 1/2019 |
| CN | 208370411 U | * | 1/2019 |
| CN | 109458591 | | 3/2019 |
| CN | 110521578 A | * | 12/2019 |
| CN | 209908901 | | 1/2020 |
| CN | 209908908 | | 1/2020 |
| CN | 209908908 U | * | 1/2020 |
| KR | 20100132840 | | 12/2010 |
| KR | 10-1463982 | | 11/2014 |
| KR | 10-2019-0117274 | | 10/2019 |
| WO | 2016/051207 | | 4/2016 |

\* cited by examiner

COMBINED LED LIGHTING SYSTEM FOR PLANT GROWTH

FIELD

The present disclosure relates to the field of lighting for plant growth, and in particular to a combined LED lighting system with LED for plant growth.

BACKGROUND

At present, a light fixture used to promote plant growth is a special kind of light fixture. According to the growth rules of the vast majority of plants, sunlight is required. The light fixture used to promote plant growth is to employ the principle of sunlight by using the emitted light to replace the sunlight, so as to provide a good growth and development environment for plants, which promotes the plant growth and development.

High power gas-discharge lamps and metal halide lamps are often used to provide grow light due to the generation of strong light. After application tests, the light wavelength of light fixtures used to promote plant growth is quite suitable for plant growth, flowering and fruiting. In general, indoor plants will grow worse and worse over time. The main reason is the lack of light irradiation. The growth and development can be promoted by LED lamp irradiation with suitable spectrum for plants. The application of the high-efficiency light source system to greenhouses, conservatories and other facilities in agricultural production, on the one hand, can resolve the issue of poor taste of tomatoes, cucumbers and other greenhouse vegetables due to insufficient sun irradiation, on the other hand, can also make solanaceous vegetables available on the market before and after the Spring Festival in winter, so as to achieve the purpose of out-of-season cultivation.

At present, there are many LED lighting lamps for plant. The Chinese patent publication No. CN 208566289 U disclosed a LED lighting lamp for plant comprising a sliding track and an LED lamp body, in which the sliding track is fixed in the factory buildings; and the LED lamp body can be arranged slidably along the sliding track. In such a LED lighting lamp for plant, the LED lamp body is arranged on the sliding track, which is convenient for users to replace the LED lamp body after sliding away from a plant rack along the sliding track, so as to avoid the limitation of the plant rack when replacing the LED lamp body and facilitate the user's operation.

However, in practice, it is often necessary to adjust the LED lighting lamp for plant to make its luminous power suitable for plant growth at different time points.

SUMMARY

The present invention provides a combined LED grow lighting system which can adjust the power of LED plant light to deal with the above deficiencies of the LED plant light in the prior art.

A technical solution provided in the present disclosure to achieve its technical objectives is: a combined LED grow lighting system, comprising an LED light track and at least one LED light strip which slidably connects with and longitudinally slides along the LED light track; wherein a remote control signal receiver to receive a remote control signal is configured within the LED light track, a processing device for processing the remote control signal received by the remote control signal receiver to generate a control signal for controlling a power of LED in each LED light strip is connected with each LED light strip, respectively; an LED constant current power supply and a constant current control circuit are configured within the LED light strip, the constant current control circuit is connected with the processing device and receives the control signal regarding the power of the LED light strip (1) sent from the processing device to control the LED constant current power supply.

A remote control manner is used herein to adjust the power of LED light strip to overcome the deficiencies in the prior art.

Further, in the above-mentioned combined LED grow lighting system, in the processing device, the control signal for controlling the power of the LED light strip in the remote control signal is converted into a PWM signal and sent to the constant current control circuit, and a duty ratio of the PWM signal is a percentage of a controlled maximum power of the LED light strip.

Further, in the above-mentioned combined LED lighting system, the LED constant current power supply comprises an EMI filter and rectifier circuit, a critical conduction mode power factor correction (CRMPFC) circuit, an LLC half-bridge resonant circuit and an output rectifier and filter circuit; wherein a commercial power is filtered and rectified by the EMI filter and rectifier circuit and enters the CRM-PFC circuit to form a high-voltage DC electrical signal, which enters the LLC half-bridge resonant circuit, a switch of the LLC half-bridge resonant circuit is controlled by the PWM signal received by the constant current control circuit, and a resonant signal output by the LLC half-bridge resonant circuit is rectified and filtered by the output rectifier and filter circuit and connected with a LED.

Further, the above-mentioned combined LED grow lighting system further comprises a negative feedback circuit, wherein the negative feedback circuit comprises an LED constant current sampling circuit, of which an output is connected with the constant current control circuit, and the constant current control circuit adjusts the PWM signal according to the output of the LED constant current sampling circuit.

Further, in the above-mentioned combined LED grow lighting system, wherein the LLC half-bridge resonant circuit has two resonant frequencies, of which one is approximately 45 kHz and the other is approximately 120 kHz, and a working frequency is configured between the two resonant frequencies.

Further, in the above-mentioned combined LED grow lighting system, a connecting structure of the LED light strip which slidably connects with and longitudinally slides along the LED light track comprises a buckle connecting the LED light track with the LED light strip, wherein the buckle comprises a hook plate, a pressing plate and a hanging plate, one end of the hook plate is configured with a hook, another end of the hook plate is configured with a hook plate connecting ear having an installation hole, one end of the pressing plate is configured with a pressing plate connecting ear, and a hook plate connecting hole and a hanging plate connecting hole are configured in parallel on the pressing plate connecting ear, one end of the hanging plate is configured with a hanging piece which is perpendicular to a main body, and another end of the hanging plate is configured with a hanging plate connecting ear having an installation hole, the hook of the hook plate is arranged in a same direction with the hanging piece of the pressing plate, the pressing plate connecting ear is connected with axle holes of the hook plate connecting ear and the hanging plate connecting ear, respectively, forming a structure, in which the hook plate rotates around the pressing plate, and the pressing plate drives the hook plate to rotate around the hanging plate, a surface of the LED light track is configured with a convex ridge corresponding the hook of the hook plate, a surface of the light strip is configured with a slot corresponding the hanging piece of the hanging plate, one end of the buckle is hooked with the convex ridge of the LED light track (1) via the hook, and another end of the buckle is plugged in the slot of the LED light strip via the hanging piece.

Further, in the above-mentioned combined LED grow lighting system, a spacing of the pressing plate connecting ear is greater than a spacing of the hook plate connecting ear, and a spacing of the hanging plate connecting ear is greater than a spacing of the pressing plate connecting ear.

Further, in the above-mentioned combined LED grow lighting system, another end of the pressing plate is configured with a bent hand pressing part.

The following is a further explanation of the present disclosure with reference to drawings and specific embodiments.

DETAILED DESCRIPTION

Example 1

Figure 1:
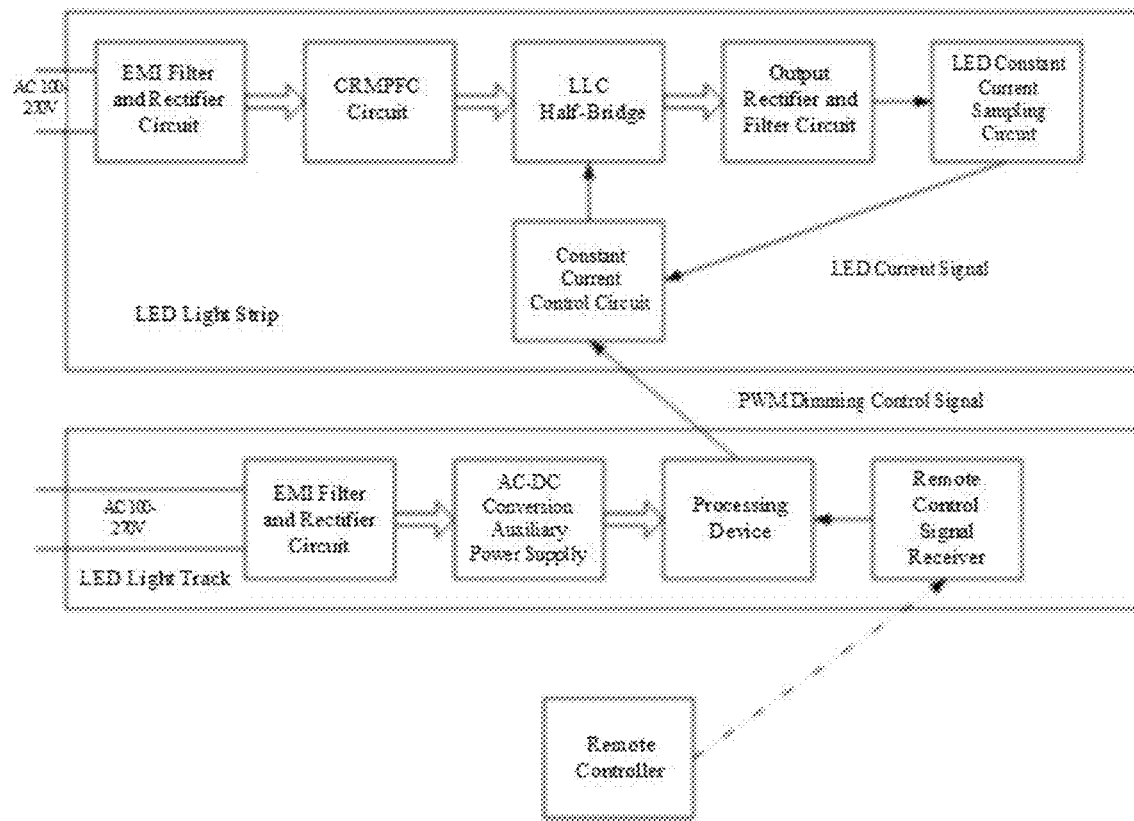
FIG. 1 illustrates a principle block diagram of a combined LED grow lighting system in the present disclosure.
Figure 2:
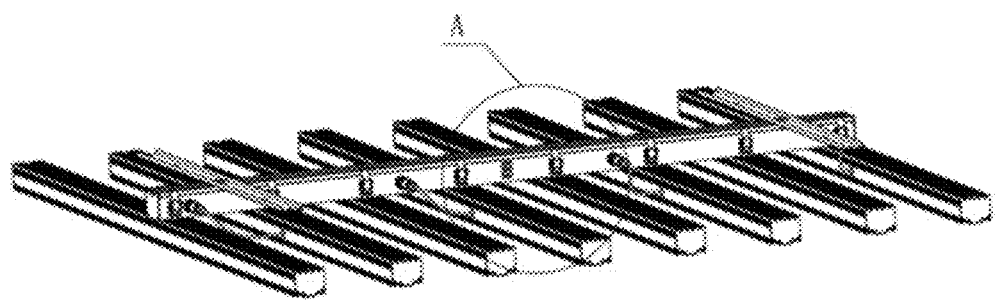
FIG. 2 illustrates a structure diagram of a combined LED grow lighting system in the present disclosure.
Figure 3:
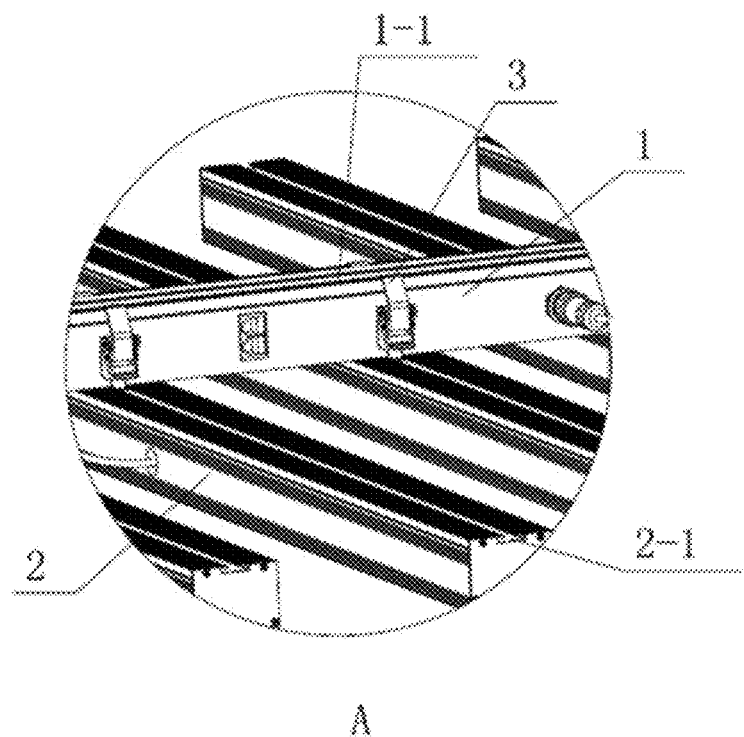
FIG. 3 illustrates a partial enlarged view A of FIG. 2.
Figure 4:
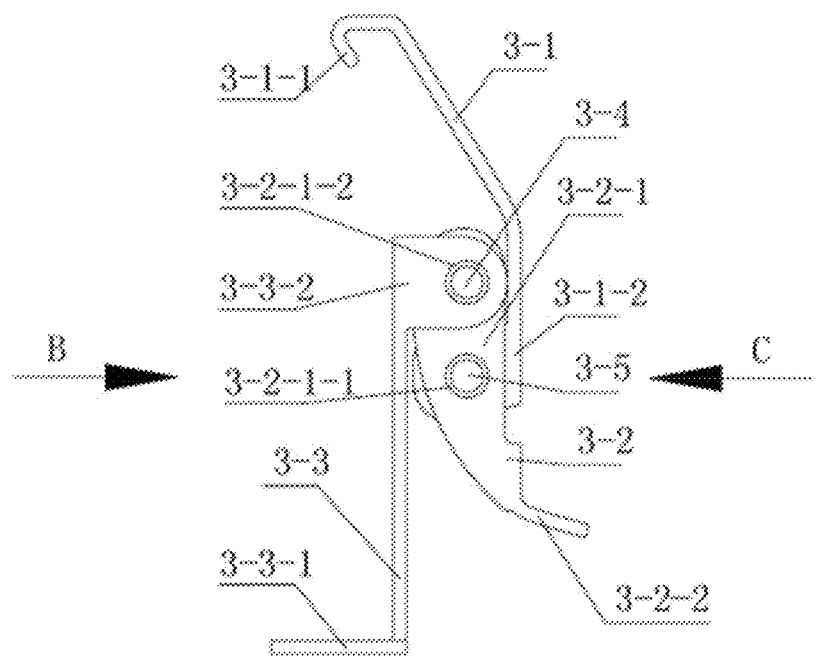
FIG. 4 illustrates a structure diagram of a buckle used in the present disclosure.
Figure 5:
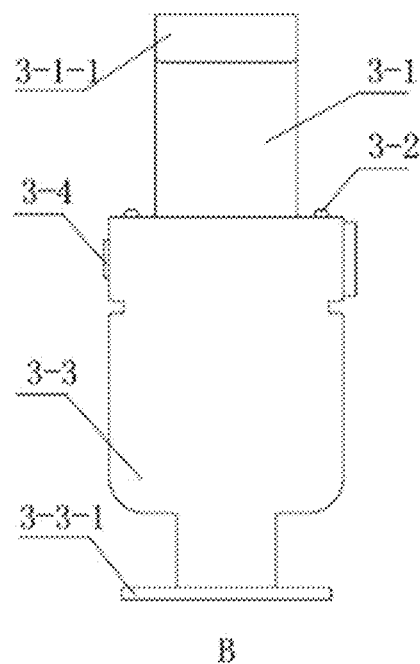
FIG. 5 illustrates the B direction view of FIG. 4.
Figure 6:
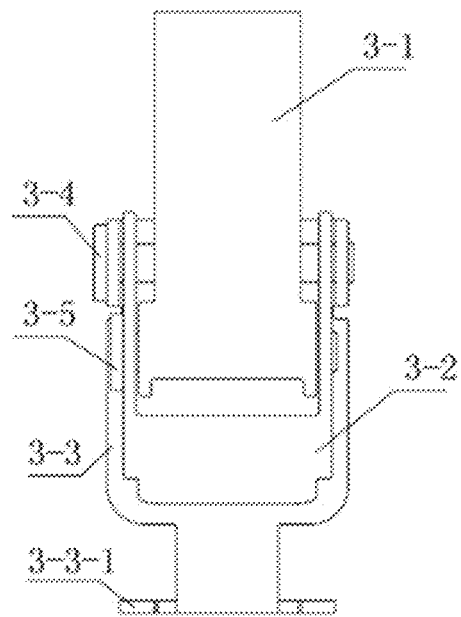
FIG. 6 illustrates the C direction view of FIG. 4.

The present example is a detachable and freely combined LED grow lighting system. As shown in FIG. 1 and FIG. 2, a suitable number of LED light strips can be freely combined on a LED light track 1. The LED light strip 2 in the detachable and freely combined LED grow lighting system of the present example comprises light strips with various spectra, such as white light, red light, blue light, ultraviolet light, etc. In the LED light track 1, a commercial power adapter adapts a commercial power to all LED light strips 2 slidably connected with the LED light track 1. In addition, a remote control signal receiver is configured in the LED light track 1 to receive a remote control signal sent by a remote controller and a processing device for processing the remote control signal received by the remote control signal receiver is configured to generate a control signal for controlling a power of LED in each LED light strip 2. The processing device is connected with each LED light strip 2, respectively. An LED constant current power supply and a constant current control circuit are configured within the LED light strip 2. The constant current control circuit is connected with the processing device and receives the control signal regarding the power of the LED light strip 1 sent from the processing device to control the LED constant current power supply. During the process of remote control, the lighting spectrum of the whole system can be adjusted to be suitable for plant growth by adjusting the power of the LED light strips with different spectra.

In the present example, the process for dimming and controlling of the LED plant light comprises: inputting a 0% to 100% brightness value by an operator through a human-machine interface of a SLC controller or a 0% to 100% brightness value through other remote controllers; sending an analog signal of 0 to 10 V by the SLC controller or the remote controller; transmitting the analog signal to the processing device after received by the remote control signal receiver of the LED light track 1; converting the analog signal of 0 to 10 V into a 0% to 100% PWM signal after processed in the processing device and sending to the constant current control circuit of the LED light strip; and realizing a brightness variation of LED from 0% to 100% by controlling the current on LED within a range of 0 to 2 A via the constant current control circuit according to the 0% to 100% PWM signal. In the present example, in the processing device, the control signal for controlling the power of the LED light strip 2 in the remote control signal is converted into a PWM signal and sent to the constant current control circuit. The duty ratio of the PWM signal is a percentage of a controlled maximum power of the LED light strip 2.

As shown in FIG. 1, in the present example, the LED constant current power supply comprises an EMI filter and rectifier circuit, a CRMPFC circuit, an LLC half-bridge resonant circuit and an output rectifier and filter circuit, a commercial power is filtered and rectified by the EMI filter and rectifier circuit and enters the CRMPFC circuit to form a high-voltage DC electrical signal, which enters the LLC half-bridge resonant circuit, a switch of the LLC half-bridge resonant circuit is controlled by the PWM signal received by the constant current control circuit, and a resonant signal output by the LLC half-bridge resonant circuit is rectified and filtered by the output rectifier and filter circuit and connected with a LED. LED needs a constant current source with constant current to work stably, while the voltage after rectification is a voltage source with unstable voltage. Therefore, the LED will be burned if driven by it directly. Accordingly, power factor can be improved and the pollution of harmonic current to the power grid can be reduced by introducing PFC. The introduction of LLC half-bridge resonant circuit plays a role on converting the constant voltage after rectification, filtering and PFC boosting into a voltage and current suitable for stable operation of LED. Herein the LLC half-bridge resonant circuit has two resonant frequencies, of which one is approximately 45 kHz and the other is approximately 120 kHz, and a working frequency is configured between the two resonant frequencies.

In the LED constant current power supply of the present example, in addition to the EMI filter and rectifier circuit for filtering and rectifying the 100 to 270 V AC, an output rectifier and filter circuit for rectifying and filtering the resonance signal output from the LLC half-bridge resonant circuit is configured. The constant DC voltage boosted by PFC will become high-frequency AC after the voltage has been reduced and inverted by the LLC circuit, which can be converted to a voltage and current value suitable for LED operation after rectification and filtering. EMI filtering and rectification rectifies the industrial frequency AC voltage from a power grid into a unidirectional pulsating wave and filters out the high-frequency harmonic.

The LED constant current power supply of the present example further comprises a negative feedback circuit, wherein the negative feedback circuit comprises an LED constant current sampling circuit, of which an output is connected with the constant current control circuit, and the constant current control circuit adjusts the PWM signal according to the output of the LED constant current sampling circuit.

The LED lamp track 1 also has its own voltage stabilizing circuit, which converts the commercial power into a DC power required by the processing device, i.e. MCU. The voltage stabilizing circuit comprises an EMI filter and rectifier circuit for rectifying and filtering 100 to 270 V AC commercial power and an AC-DC conversion auxiliary power supply. Herein, the AC-DC conversion auxiliary power supply is a low power supply with flyback topology, which is used to convert the input 100 to 277 V AC into 12 V DC power supply for the processing device including MCU in the light track. The input of the LED light track 1 is AC, which becomes 141 to 390 V high-voltage DC after filtered and rectified by EMI filter and rectifier circuit. As such voltage is too high to be supplied directly to MCU controller, the voltage must be reduced by an auxiliary power supply before it can be fed to the MCU controller.

In the present example, in the LED light track, the MCU in the processing device outputs a PWM signal, which is only a 1 kHz fixed frequency signal, while the LLC is controlled by a variable frequency signal from 45 kHz to 300 kHz, so it cannot be used directly. Therefore, the constant current control circuit is a circuit integrating sampling, error amplification and loop compensation. The constant current control circuit samples the current output to LED, compares it with a set value and amplifies the error, and then compares the amplified error signal with a PFM comparator to obtain a set of PFM signals to drive the LLC half-bridge to work in a frequency range required by the set current value. In the negative feedback circuit, the sampling circuit samples the current output to the LED light strip. In the constant current control circuit, a sampling signal is used to correct the duty ratio of PWM.

In the combined LED grow lighting system of the present example, eight LED light strips 2 can be connected with one LED light track 1, and the LED light track 1 is connected with the commercial power supply to transfer the commercial power. The commercial power is transferred to each LED light strip 2 by industrial frequency cable, and the constant current power required by LED is formed after rectified, filtered and so on in each LED light strip 2. Moreover, a control signal for controlling the power of each LED light strip 2 is generated in the LED light track 1, which is transmitted to the LED light strips via a signal cable (RJ11).

In the present example, a connecting structure of the LED light strip 2 which slidably connects with and longitudinally slides along the LED light track 1 comprises a buckle 3 connecting the LED light track 1 with the LED light strip 2. The buckle comprises a hook plate 3-1, a pressing plate 3-2 and a hanging plate 3-3. One end of the hook plate 3-1 is configured with a hook 3-1-1, and another end of the hook plate 3-1 is configured with a hook plate connecting ear 3-1-2 having an installation hole. One end of the pressing plate 3-2 is configured with a pressing plate connecting ear 3-2-1. A hook plate connecting hole 3-2-1-1 and a hanging plate connecting hole 3-2-1-2 are configured in parallel on the pressing plate connecting ear 3-2-1, the hook plate connecting hole 3-2-1-1 is set in the middle, and the hanging plate connecting hole 3-2-1-2 is set at end. To facilitate to press the pressing plate 3-2, preferably in the present example, another end of the pressing plate 3-2 is configured with a bent hand pressing part 3-2-2. One end of the hanging plate 3-3 is configured with a hanging piece 3-3-1 which is perpendicular to a main body. The hanging piece 3-3-1 and the main body of the hanging plate 3-3 are in the shape of "L". Another end of the hanging plate 3-3 is configured with a hanging plate connecting ear 3-3-2 having an installation hole.

The hook 3-1-1 of the hook plate 3-1 is arranged in the same direction with the hanging piece 3-3-1 of the pressing plate 3-3. The pressing plate connecting ear 3-2-1 is connected with the axle holes of the hook plate connecting ear 3-1-2 and the hanging plate connecting ear 3-3-2, respectively, forming a structure, in which the hook plate 3-1 rotates around the pressing plate 3-2, and the pressing plate 3-2 drives the hook plate 3-1 to rotate around the hanging plate 3-3. In the present example, the hook plate 3-1 and the pressing plate 3-2 are flexibly connected by a hook plate connecting shaft 3-5. The pressing plate 3-2 and the hanging plate 3-3 are flexibly connected by a hanging plate connecting shaft 3-4. To facilitate assembly, preferably in the present example a spacing of the pressing plate connecting ear 3-2-1 is greater than a spacing of the hook plate connecting ear 3-1-2, and a spacing of the hanging plate connecting ear 3-3-2 is greater than a spacing of the pressing plate connecting ear 3-2-1, forming a structure, in which hook plate 3-1 is installed in the pressing plate 3-2 and pressing plate 3-2 is installed in the hanging plate 3-3.

The surface of the LED light track 1 is configured with a convex ridge 1-1 corresponding the hook 3-1-1 of the hook plate 3-1. The height of the convex ridge 1-1 shall meet the size requirement so that the hook 3-1-1 can hook tightly. The surface of the light strip 2 is configured with a slot 2-1 corresponding the hanging piece 3-3-1 of the hanging plate 3-3. An end of the buckle 3 is hooked with the convex ridge 1-1 of the LED light track 1 via the hook 3-1-1, and another end of the buckle 3 is plugged in the slot 3-1 of the LED light strip 2 via the hanging piece 3-3-1.

When fixing the LED light track 1 with the LED light strip 2, firstly, the LED light track 1 and the LED light strip 2 are placed according to the installation position. Then, the hanging piece 3-3-1 of the buckle 3 is inserted into the slot 2-1 of the LED light strip 2, and the buckle 3 is pushed forward so that the hook 3-1-1 is above the convex ridge 1-1 of the LED light track 1. Finally, the hand pressing part 3-2-2 of the pressing plate 3-2 is pressed down. When the pressing plate 3-2 and hook plate 3-1 rotate relative to the hanging plate 3-3, the hook 3-1-1 is fit closely with the convex ridge 1-1 of the LED light track 1, and the LED light track 1 and the LED light strip 2 are fixed to form a whole by the buckle 3. The whole installation process is simple, flexible, fast and efficient.

The invention claimed is:

1. A combined LED lighting system for plant growth, comprising an LED light track and at least one LED light strip which slidably connects with and longitudinally slides along the LED light track;

wherein:
- a remote control signal receiver to receive a remote control signal is configured within the LED light track,
- a processing device for processing the remote control signal received by the remote control signal receiver to generate a control signal for controlling a power of LED in each LED light strip is connected with each LED light strip, respectively;
- an LED constant current power supply and a constant current control circuit are configured within the LED light strip, and
- the constant current control circuit is connected with the processing device and receives the control signal regarding the power of the LED light strip sent from the processing device to control the LED constant current power supply;

wherein in the processing device, the control signal for controlling the power of the LED light strip in the remote control signal is converted into a PWM signal and sent to the constant current control circuit, and a duty ratio of the PWM signal is a percentage of a controlled maximum power of the LED light strip;

wherein the LED constant current power supply comprises an EMI filter and rectifier circuit, a critical conduction mode power factor correction (CRMPFC) circuit, an LLC half-bridge resonant circuit and an output rectifier and filter circuit, a commercial power is filtered and rectified by the EMI filter and rectifier circuit and enters the CRMPFC circuit to form a high-voltage DC electrical signal, which enters the LLC half-bridge resonant circuit, a switch of the LLC half-bridge resonant circuit is controlled by the PWM signal received by the constant current control circuit, and a resonant signal output by the LLC half-bridge resonant circuit is rectified and filtered by the output rectifier and filter circuit and connected with an LED; and wherein the combined LED lighting system for plant growth further comprises a negative feedback circuit, wherein the negative feedback circuit comprises an LED constant current sampling circuit, of which an output is connected with the constant current control circuit, and the constant current control circuit adjusts the PWM signal according to the output of the LED constant current sampling circuit.

2. The combined LED lighting system for plant growth of claim 1, wherein the LLC half-bridge resonant circuit has two resonant frequencies, of which one is 45 kHz and the other is 120 kHz, and a working frequency is configured between the two resonant frequencies.

3. The combined LED lighting system for plant growth of claim 1, wherein a connecting structure of the LED light strip which slidably connects with and longitudinally slides along the LED light track comprises a buckle connecting the LED light track with the LED light strip, wherein the buckle comprises a hook plate, a pressing plate and a hanging plate, one end of the hook plate is configured with a hook, another end of the hook plate is configured with a hook plate connecting ear having an installation hole, one end of the pressing plate is configured with a pressing plate connecting ear, and a hook plate connecting hole and a hanging plate connecting hole are configured in parallel on the pressing plate connecting ear, one end of the hanging plate is configured with a hanging piece which is perpendicular to a main body, another end of the hanging plate is configured with a hanging plate connecting ear having an installation hole, the hook of the hook plate is arranged in a same direction with the hanging piece of the pressing plate, the pressing plate connecting ear is connected with axle holes of the hook plate connecting ear and the hanging plate connecting ear, respectively, forming a structure, in which the hook plate rotates around the pressing plate, and the pressing plate drives the hook plate to rotate around the hanging plate, a surface of the LED light track is configured with a convex ridge corresponding the hook of the hook plate, a surface of the light strip is configured with a slot corresponding the hanging piece of the hanging plate, one end of the buckle is hooked with the convex ridge of the LED light track via the hook, and another end of the buckle is plugged in the slot of the LED light strip via the hanging piece.

4. The combined LED lighting system for plant growth of claim 3, wherein a spacing of the pressing plate connecting ear is greater than a spacing of the hook plate connecting ear, and a spacing of the hanging plate connecting ear is greater than a spacing of the pressing plate connecting ear.

5. The combined LED lighting system for plant growth of claim 3, wherein another end of the pressing plate is configured with a bent hand pressing part.

6. A combined LED lighting system for plant growth, comprising an LED light track and at least two LED light strips which slidably connect with and longitudinally slide along the LED light track, wherein the LED light track comprises:

a remote control signal receiver for receiving a remote control signal;

a processing device for processing the remote control signal received by the remote control signal receiver to generate a control signal for controlling powers of the LED light strips is connected with each of the LED light strips, respectively;

an LED constant current power supply and a constant current control circuit are configured within each of the LED light strips, and the constant current control circuit is connected with the processing device and receives the control signal regarding the power of each of the LED light strips sent from the processing device to control the LED constant current power supply;

wherein the processing device converts the control signal for controlling the powers of the LED light strips in the remote control signal into a PWM signal and sends the PWM signal to the constant current control circuit, and a duty ratio of the PWM signal is a percentage of a controlled maximum power of the LED light strips; and wherein the LED constant current power supply further comprises a negative feedback circuit, wherein the negative feedback circuit comprises an LED constant current sampling circuit, of which an output is connected with the constant current control circuit, and the constant current control circuit adjusts the PWM signal according to the output of the LED constant current sampling circuit.

7. The combined LED lighting system for plant growth of claim 6, wherein the LED light strips have at least two different spectra.

8. The combined LED lighting system for plant growth of claim 6, wherein the LED track is detachably connected with the LED strips by a buckle.

9. The combined LED lighting system for plant growth of claim 6, wherein the LED strips can be freely combined.

10. The combined LED lighting system for plant growth of claim 6, wherein the LED constant current power supply comprises an EMI filter and rectifier circuit, a critical conduction mode power factor correction (CRMPFC) circuit, an LLC half-bridge resonant circuit and an output rectifier and filter circuit, a commercial power is filtered and rectified by the EMI filter and rectifier circuit and enters the CRMPFC circuit to form a high-voltage DC electrical signal, which enters the LLC half-bridge resonant circuit, a switch of the LLC half-bridge resonant circuit is controlled by the PWM signal received by the constant current control circuit, and a resonant signal output by the LLC half-bridge resonant circuit is rectified and filtered by the output rectifier and filter circuit and connected with an LED.

\* \* \* \* \*